June 11, 1968

G. J. LUPEAR 3,387,509

WORK TOOL FIXTURE

Filed Sept. 20, 1965

INVENTOR.
George J. Lupear
BY
Dale A. Winnie
ATTORNEY

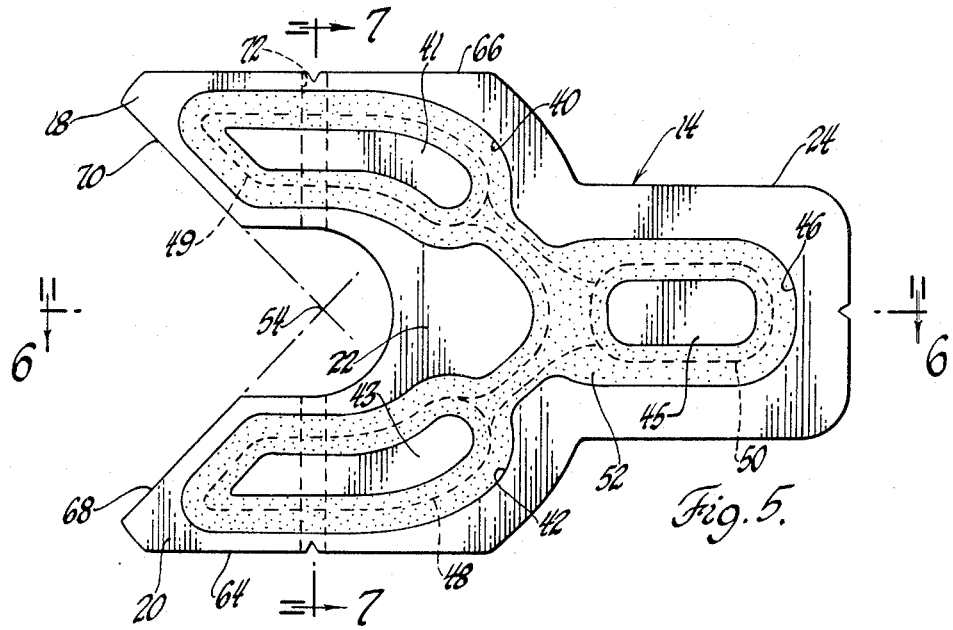

United States Patent Office 3,387,509
Patented June 11, 1968

3,387,509
WORK TOOL FIXTURE
George J. Lupear, 8125 Marshalsea,
Union Lake, Mich. 48085
Filed Sept. 20, 1965, Ser. No. 488,422
4 Claims. (Cl. 77—59)

ABSTRACT OF THE DISCLOSURE

A work tool stand which includes a semicircular base with magnetic means of engagement to a supporting surface and for supporting a work tool centrally over the work area therewithin in a manner which precludes a base lifting leverage action and rotation of the base about the work area.

This invention relates to tools and fixtures in general and more particularly to a magnetic stand or fixture for a drill press.

Most machine tool operations which require any drilling, reaming, tapping, counter-boring and such, with any precision, have always required that the work be done on a fixed stand press. Usually this also means that the work has to be moved relative to the work tool except for larger and more expensive equipment with a projecting arbor or the like. When the work is of any size this may cause a great deal of difficulty and expense.

As can be appreciated, portable hand carried drills are seldom really suitable for the precision and accuracy of close tolerance jobs nor are they capable of developing the cutting power and feed that may be required.

In recent years, efforts have been made to provide a magnetic stand or fixture for use with a drill press to enable it to be moved relative to the work, instead of vice versa. In principle, this has involved using a stand with some type of magnetic means provided in the base and able to securely hold the stand in place. In some instances electro-magnetic means have been used for this purpose.

Much greater versatility is obtained in the use of a portable fixture with some means of anchoring it down for working purposes. It can be moved from one location to another, be positioned on a work surface and be shifted and freely moved into a working position before power is applied. Afterwards, under power and with sufficient magnetic pull, it is essentially immovable and can provide a much greater work force than would otherwise be possible.

The magnetic type stand for a portable drill press usually includes a fixture with a large base. This is necessary in most instances to accommodate a large enough and strong enough electro magnet to provide the required holding force. It may also be necessary to provide sufficient support surface engagement to counteract and overcome the leverage force due to the overhang of the drill at one end of the stand and when it is put in service.

Obviously, the size of the base, and what is in it, affects the size, weight and bulk of the magnetic stand, as a whole, and its desirability for use on different jobs.

Present equipment, as indicated, leaves several things to be desired. Among these are a reduction in size, weight and bulk but without a sacrifice of holding force or of the work effort that the equipment is capable of putting forth.

It is an object of this invention to provide a portable drill press which is economical, safe and easy to own and operate.

It is an object of this invention to provide a piece of equipment which includes a variable electro-magnetic power source to enable free positioning movement and subsequent positive position holding power for the work required.

It is an object of this invention to provide an electromagnetic drill stand which is compact in arrangement, comparatively light in weight, and easily portable for many uses, and which has degausing means to permit quick removal and relocation as required.

It is an object of this invention to provide a new and much improved base support for equipment of this type and which avoids the leverage problem of similar equipment made and placed in service heretofore.

As will subsequently be shown and more fully described, the base support of the work tool fixture of this invention is directly under the work tool and formed to receive the tool centrally therethrough so that principally only the vertical lift forces have to be countered and these are best and most easily handled by the electromagnetic force and contact surface engagement obtained with the unit in the manner and way that the electromagnetic force is applied.

These and other objects and advantages to be gained in the practice of this invention will be more fully understood and appreciated upon a reading of the following specification having reference to the accompanying drawings.

In the drawings:

FIGURE 5 is a bottom plan view of the base of the drill stand fixture of this invention.

Figure 1:
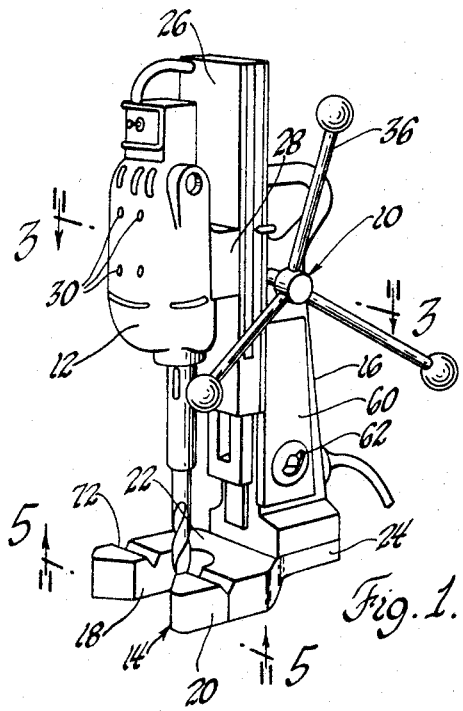
FIGURE 1 is a perspective view of the work tool fixture of this invention with the work tool shown in one usable position.

FIGURES 6 and 7 are cross-sectional views taken through the drill stand fixture base shown by the last mentioned drawing figure and in the planes of lines 6—6 and 7—7, respectively.

The work tool device of this invention includes a stand or fixture part 10 on which is mounted the actual work tool; in the disclosed instance a heavy duty electric drill 12.

The stand or work tool supporting fixture part 10, is formed to provide a base 14 over which extends a columnar support 16. The base 14 is U-shaped with arm parts 18 and 20 extended in one direction, a connecting part 22, and a rearwardly disposed part 24. The columnar support 16 is provided over the latter and may be cast or otherwise formed and secured to the base.

The base 14 is made of a low carbon steel and the columnar support 16, as well as other parts on the upper part of the stand 10, are preferably made of a light weight non-magnetic material, such as aluminum. They are formed to include the desired and necessary structural ribs, webs and reinforcements to provide the strength needed without undue problems of weight and bulk.

A slide carriage 26 is provided on the columnar support and it has the drill 12 mounted on it.

The work tool, drill 12, is actually engaged to a saddle block 28 attached to the carriage member 26. Four screws are used to cooperate with suitable tapped and threaded holes 30 in the drill case, on opposite sides of it, and which enable the drill to be turned on its own axis 180° and end-for-end 180° to give variable positions for drilling close to a wall or complimentary holes, one over the other, as will later be more fully explained and appreciated.

The slide carriage part 26 may also be reversible on the guide rails of the columnar support 16 for the end-for-end relocation of the drill 12 just mentioned.

The slide carriage 26 includes a gear toothed rack bar 32 which cooperates with a pinion gear 34 mounted in the columnar support 16 and rotated by a feed handle arrangement 36, as commonly known.

Figure 3:
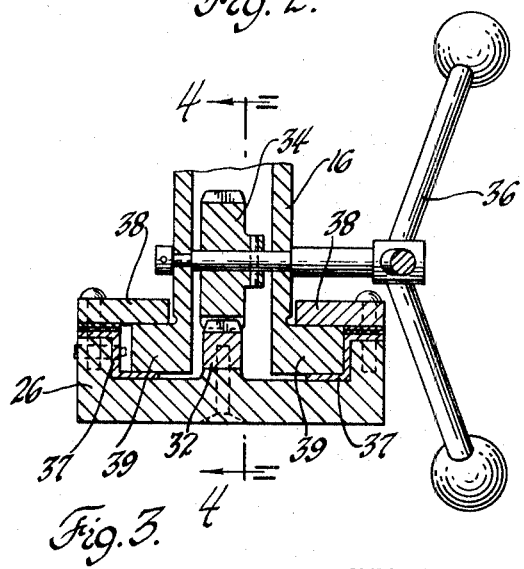
FIGURE 3 is an enlarged cross-sectional view taken in the plane of line 3—3 of the first drawing figure and showing the rack and pinion drive means for the work tool supporting carriage.

As shown by FIGURE 3, the slide carriage 26 has Z rail bearing surfaces 36 and retaining gib rails 38, shimmed as required, for close fitting engagement on the guide rails 40 of the columnar support.

The base 14 of the tool supporting stand or fixture 10 is formed on its underside, as best shown in FIGURES 5–7, to include cavities 40, 42 and 44. These are interconnected and are receptive of coils 46, 48 and 50, respectively, adapted to provide an electro-magnetic force to hold the base 14 immovable on a supporting work table or other surface.

The cavities 40, 42 and 44 are formed to leave a core part 41, 43 and 45 about which the coils are disposed. The coils are wound before installation and are just inserted in the cavities; as with the coils of motors, generators and other electrical power operated devices. The common coil forming binder material 52 is used to hold the coils in the respective cavities and to fill the space thereof without adversely affecting the magnetic force generated by the coils when under power.

It will be appreciated that the coils and cavities in the extended arms 18 and 20 of the U-shaped base part 14 are disposed in an arc with respect to the center point 54 between the arms which, as later shown, is the work area center point. The other coil and cavity, while somewhat removed and more in the rearwardly disposed part 24 of the base, fills the gap between the two arm parts. As later shown, however, it has another function as well.

The core parts in the different cavities 40, 42 and 44 are about twice the thickness of the outer walls of the base part and the top wall thickness of the base, over the cavities, is about the same double thickness. These have been found to be about the minimum thickness requirements to confine the magnetic force of the coils to the underside of the base and minimize the upper and side wall effects.

The low carbon steel core parts 41, 43 and 45 once magnetized, of course, have considerable residual magnetism. This is used to advantage in that a loss of power will not mean that the work tool stand may have to be re-positioned and checked again, or that it will fall from vertical surfaces if magnetically mounted on them. In fact, the holding power is so great that means are provided in the electrical system for reversing the power flow to degauss and demagnetize when necessary and/or desirable.

Figure 2:
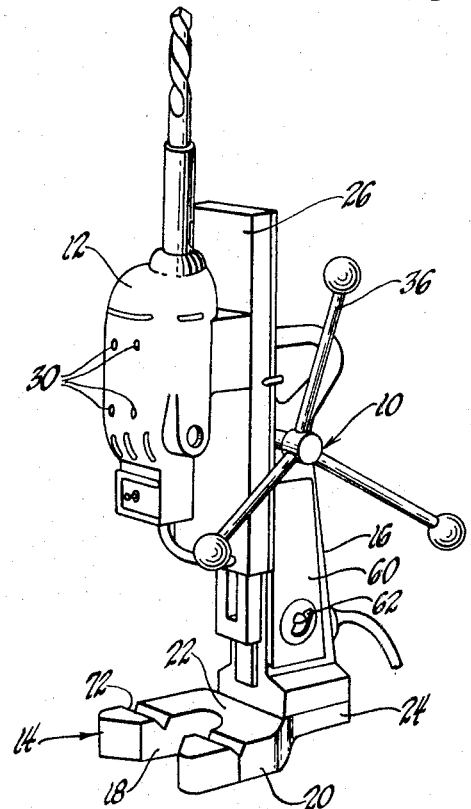
FIGURE 2 is a perspective view of the work tool fixture of the invention with the work tool shown in another usable position.
Figure 4:
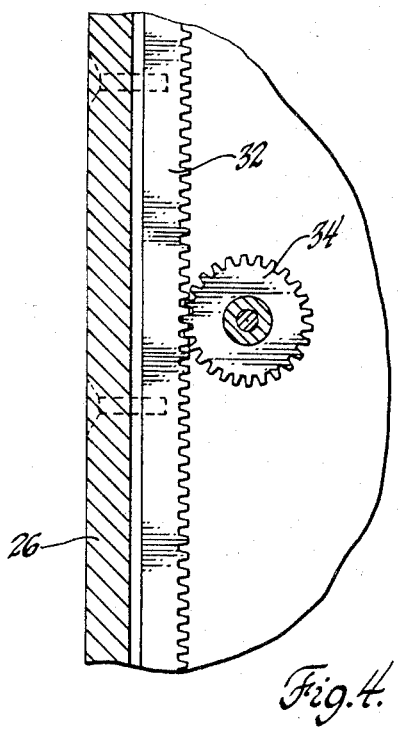
FIGURE 4 is a cross-sectional view of a fragmentary part of the drive means as seen in the plane of line 4—4 of the last mentioned drawing figure.

In FIGURES 1 and 2 there is shown a control panel 60 in the columnar support for rheostat means and the electrical connections to the drill motor and the coils in the base 14, which are connected in series. By simple switch means, as at 62, a high resistance low power feed to the coils 42, 44 and 46 can provide just enough magnetic pull to hold the stand wherever desired but still enable it to be moved about for best work tool positioning.

More power, will make the stand immovable and a reversal of current flow, as mentioned, can be used to demagnetize everything.

For drilling and other torque inducing tools, the rearwardly set coil 50 is particularly effective to prevent the stand 10 from tending to twist. It is set back sufficiently from the work center point 54 to provide a good fulcrum arm distance. This also enables the use of a smaller coil, in the order of 40–50 ohms to 70 ohms, in comparison to the side coils 46 and 48 disposed concentrically about and closer to the work center point.

For expediency, it will be noted that the sides of the arms 18 and 20 of the base 14 are squared with respect to each other; as at 64 and 66. Also, the ends of the arms are cut at a 45° angle, as at 68 and 70, for easier location of the work center point 54. Still fufrther, a V-block cut 72 across the arms enables them to center bar stock for drilling when desired.

In use, the operation of the device of this invention is very simple:

The portable magnetic drill press is sufficiently light in weight, and compact in arrangement that it can be easily carried about and moved from one location to another. Obviously, it may be made in different sizes so that it is manually portable or it may be made sufficiently large, without losing its portable character, to do many jobs heretofore possible only by stationary fixed drill press installations.

When the work member is large enough and includes a suitable surface area, the drill press device of this invention may be mounted right on it. In fact, the actual supporting surface area for this work tool device is *less* than the size of the base part 14. This is because of the holding power of the electro-magnetic means in the base which will permit the tool stand to be supported on the end of a post, for example, or other small work surface area.

Although not mentioned previously, it will be appreciated that the work tool device of this invention may be attracted to non-magnetic material by the use of a low carbon steel plate under or on the opposite side of the non-magnetic item. This same expediency may be used for greater holding strength with thin gauge high carbon steels.

In practice, the stand 10 and drill 12 are provided as a portable magnetic drill press.

The power drill 12 is provided on the slide carriage 26 with the drill bit towards the base part 14 and aligned over the work center point 54 thereof. It is electrically connected through the slide, into the control box 60 and thence to the power source. Suitable switch means on the drill itself enable it to be turned on and off.

Once the proper bit is in the drill chuck, the base 14 is oriented over the work piece to be drilled, reamed or whatever and is gauged on the centerpunch or by the flat side walls 64, 66 or angle cut ends 68, 70 of the arms 18 and 20 of the basepart.

The control 62 is used to provide just enough power to the coils 46, 48 and 50 to hold the stand down but not enough to prevent it from being adjusted; that is, intentionally adjusted and with some effort. If the unit has been used before it may have sufficient residual magnetism for this, but otherwise the low power control is used. For some units, several stepped power conditions may be provided.

After the stand is centered over the work spot, full power is applied to the coils so that the stand is essentially immovable relative thereto.

All that remains is to turn the drill on and operate the feed handle 36 to move the slide carriage 26, with the drill, down into work engagement with the work piece.

Bar stock can be drilled by laying it across the V-block slot 72.

A complementary hole, directly over one provided between the arms 18 and 20 of the base, is easily obtained by turning the drill end-for-end 180°, either of itself or with the slide carriage.

To drill closer to a wall, for example, the drill can be turned 180° on its own axis so that the bit lies closer to the extended ends of the arms 18 and 20 of the base part, 14.

When the work is done, the power is turned off and the work tool device can be moved to another location for another job. If the residual magnetic force is too strong and resists movement of the stand, the switch 62 is turned to reverse the power to the coils 46, 48 and 50 and to demagnetize the cores 41, 43 and 45.

Although a preferred embodiment of this invention has been shown and described, with particular emphasis on certain individual features, it is to be understood that the overall combination and the individual features are both to be considered along with such variations and modifications therein as are within the spirit and scope of the teachings set forth by the hereinafter appended claims.

Such modifications and improvements as are not specifically excluded by the language of the hereinafter appended claims, and are within the spirit thereof, are to be considered as inclusive thereunder.

I claim:
1. A work tool stand, comprising:
a generally horizontally disposed Y-shaped base member defined by a generally U-shaped portion having an open work area therewithin and a leg portion extending rearwardly from the base of the U-shaped portion,
a columnar support provided on said leg portion and having a vertically adjustable carriage member provided thereon for supporting a work tool centrally over said work area,
generally U-shaped magnetic means provided concentrically within the extent of said U-shaped portion for holding said base member magnetically engaged to a receptive supporting surface relatively about said work area,
and less powerful magnetic means provided in said leg portion for stabilizing said base member and preventing relative rotation thereof about said work area.

2. The work tool of claim 1,
said generally U-shaped portion being of a size to provide the major means of support for a work tool on said carriage member and for receiving the work tool centrally thereover for work force engagement centrally of the work area therewithin to preclude a base lifting leverage force in the use thereof.
3. The work tool of claim 2,
said carriage means being reversible end-for-end on said columnar support for disposing a work tool for use in a relatively opposite direction with the work force vector still directed centrally through said work area.
4. The work tool of claim 2,
said generally U-shaped portion having the open ends thereof formed to provide locating walls convergent in towards the work center of the work area provided within said base section.

References Cited
UNITED STATES PATENTS

| | | | |
|---|---|---|---|
| 2,932,194 | 4/1960 | Buck | 77—59.1 |
| 2,863,338 | 12/1958 | Stewart | 77—59.1 |
| 1,946,214 | 2/1934 | Kabigting | 77—59.1 |
| 2,183,295 | 12/1939 | Lopez | 77—7 |

FRANCIS S. HUSAR, *Primary Examiner*.